H. L. TRAPHAGEN
BOILER-FEEDER.
No. 188,208. Patented March 6, 1877.
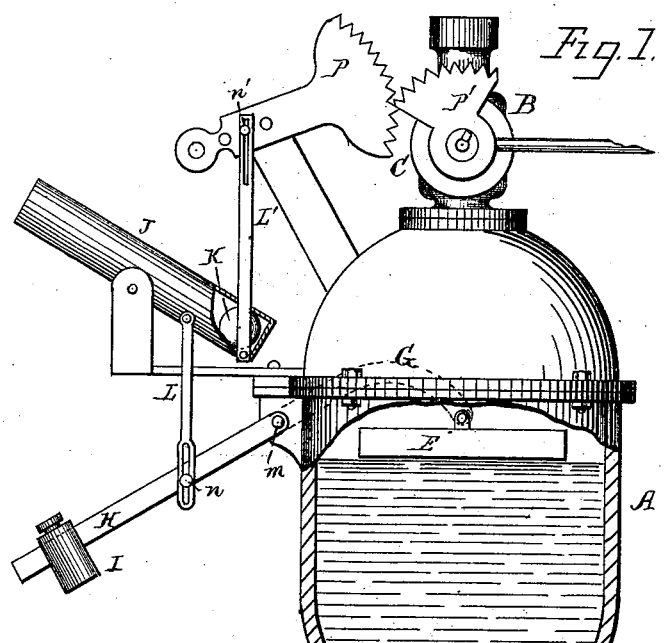
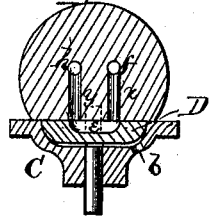
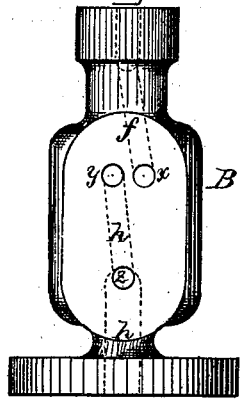
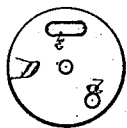

UNITED STATES PATENT OFFICE.

HENRY L. TRAPHAGEN, OF NEW YORK, N. Y.

IMPROVEMENT IN BOILER-FEEDERS.

Specification forming part of Letters Patent No. 188,208, dated March 6, 1877; application filed February 6, 1877.

*To all whom it may concern:*

Be it known that I, HENRY L. TRAPHAGEN, of New York, in the county of New York and State of New York, have invented certain new and useful Improvements in Steam-Boiler Feeders; and I do hereby declare that the following is a full, clear, and exact description thereof, reference being had to the accompanying drawings, and to the letters of reference marked thereon, which form part of this specification.

The nature of my invention consists in the construction and arrangement of a return-trap with valve for steam-boiler feeders, as will be hereinafter more fully set forth.

In order to enable others skilled in the art to which my invention appertains to make and use the same, I will now proceed to describe its construction and operation, referring to the annexed drawing, in which—

Figure 1 is a side elevation, partly in section, of my invention. Figs. 2, 3, and 4 are detailed views of the valve and valve-chamber.

A represents the trap proper, provided at the bottom with a passage, $a$, to communicate with the water-space of the boiler, for the passage of the feed-water into the same. At the top of the trap A is a plug, B, with valve-chamber C on one side, and within said valve-chamber is a rocking disk-valve, D. The valve-chamber C has an inlet, $b$, communicating by a suitable pipe with the steam-space of the boiler. In the valve D is a port, $d$, and a passage, $e$, as shown in Fig. 4. In the plug B are two passages, $f$ and $h$. The passage $f$ leads from the top down to a port, $x$, in the face, against which the valve operates. Alongside of the port $x$ is a port, $y$, opening into the passage $h$, which leads down through the plug into the trap, the two passages $f$ and $h$ being entirely disconnected from each other except when the valve D is so turned that the passage $e$ comes opposite the ports $x\,y$, when the feed-water will pass in through the passages $f$, $e$, and $h$, down into the trap. In the passage $h$ is another port, $z$, to allow the steam from the boiler—when the valve D is properly turned—to pass from the valve-chamber C through the ports $d\,z$ and passage $h$, into the trap.

Within the trap A is a float, E, connected to an arm, G, which is secured to a short shaft, $m$, and upon one end of this shaft, outside of the trap, is secured a lever, H, provided with an adjustable weight, I. In a suitable frame attached to the trap is pivoted a tube, J, closed at both ends, and containing a ball, K. To the side of this tube, near the inner end, are pivoted two arms, L and L'. The arm L hangs downward, and its lower end is slotted and passes loosely over a pin, $n$, projecting from the lever H. The arm L' extends upward and has its upper end slotted and passed loosely over a pin, $n'$, projecting from a cogged segment, P, pivoted to an arm attached to the trap. This segment meshes with a similar segment, P', secured on the journal or shaft of the valve D outside of the valve-chamber.

This trap works by the displacement of the water. When the trap is filled the lever H finishes its stroke and carries the tube J past its center, and the ball K gives the power to the segments P P' and turns the valve C so as to shut off the flow of the water into the trap, and admit the steam from the boiler into the trap. As the water falls the float descends with it, and at the proper time the tube J is reversed, and the segments turn the valve so as to shut off the steam and admit the feed-water.

Having thus fully described my invention, what I claim as new, and desire to secure by Letters Patent, is—

1. In a return-trap for boiler-feeders, the combination, with the trap A, of the plug B, having passages $f\,h$ and ports $x\,y\,z$, the valve-chamber C, with steam-inlet $b$, and the valve D, having port $d$ and passage $e$, all substantially as and for the purposes herein set forth.

2. The combination of the valve D, the segments P P', links L L', tube J, with ball K, lever H, and arm G, with float E, all substantially as and for the purposes herein set forth.

In testimony that I claim the foregoing as my own I affix my signature in presence of two witnesses.

HENRY L. TRAPHAGEN.

Witnesses:
 JOHN S. SINEY,
 WM. S. SINEY.